US007386928B1

(12) United States Patent
Crorey

(10) Patent No.: US 7,386,928 B1
(45) Date of Patent: Jun. 17, 2008

(54) METHOD FOR COVERING AN EDGE OF A SIGN

(76) Inventor: Steven M. Crorey, P.O. Box 27168, Austin, TX (US) 78755

(*) Notice: Subject to any disclaimer, the term of this patent is extended or adjusted under 35 U.S.C. 154(b) by 272 days.

(21) Appl. No.: 11/367,921

(22) Filed: Mar. 3, 2006

Related U.S. Application Data

(60) Provisional application No. 60/657,921, filed on Mar. 3, 2005.

(51) Int. Cl.

| | |
|---|---|
| ***B23P 11/02*** | (2006.01) |
| ***G09F 7/00*** | (2006.01) |
| ***E04C 2/38*** | (2006.01) |

(52) U.S. Cl. ....................... 29/453; 29/525; 29/525.01; 40/606.1; 40/612; 428/122; 248/345.1; 52/716.1; 52/716.8; 52/718.01; 52/718.04; 52/717.03

(58) Field of Classification Search .................. 29/417, 29/453, 525, 525.01; 40/606.1, 611.12, 612; 248/345.1; 52/716.1, 716.8, 718.01, 718.04, 52/717.03, 717.05; 428/122; 24/462, 545, 24/570

See application file for complete search history.

(56) References Cited

U.S. PATENT DOCUMENTS

| | | | | |
|---|---|---|---|---|
| 2,618,819 | A * | 11/1952 | Goodwillie | 428/34 |
| 2,622,357 | A | 12/1952 | Sprung | |
| 3,294,353 | A | 12/1966 | Rowe | |
| 3,935,653 | A * | 2/1976 | Klein | 40/606.13 |
| 5,165,818 | A | 11/1992 | Newhart | |
| 5,440,857 | A | 8/1995 | Shanok et al. | |
| 5,675,923 | A | 10/1997 | Sarkisian et al. | |
| 5,809,901 | A | 9/1998 | Gutzmer | |
| 5,974,712 | A | 11/1999 | Kallionpaa | |
| 6,378,831 | B1 | 4/2002 | Copeland, Jr. | |
| 6,647,652 | B1 * | 11/2003 | Seiber et al. | 40/606.1 |
| 6,708,941 | B1 * | 3/2004 | Bowen et al. | 248/345.1 |
| D509,544 | S | 9/2005 | Nickels | |
| 2002/0095840 | A1 * | 7/2002 | Seiber et al. | 40/606 |
| 2003/0110673 | A1 | 6/2003 | Tomboris | |

FOREIGN PATENT DOCUMENTS

| | | |
|---|---|---|
| WO | WO 96/19787 | 12/1995 |

* cited by examiner

*Primary Examiner*—Jermie E Cozart
(74) *Attorney, Agent, or Firm*—Eric Karich

(57) ABSTRACT

A safety bumper, and method for covering edges and corners of a street sign, has an elongate bumper element and a clip element. The elongate bumper element has a pliable body, a generally U-shaped cross-section for fitting around the edges and corners of the street sign, and two ends. The pliable body has a thickness for preventing the street sign from causing injuries, while the pliable body is still pliant enough to wrap closely around the corners of the sign without bulging away from the street sign, enabling the elongate bumper to cover substantially all of the edges and corners. The clip element functions to clip together or otherwise fasten the two ends of the elongate bumper element.

6 Claims, 2 Drawing Sheets

METHOD FOR COVERING AN EDGE OF A SIGN

CROSS-REFERENCE TO RELATED APPLICATIONS

This application for a utility patent claims the benefit of U.S. Provisional Application No. 60/657,921, filed Mar. 3, 2005.

STATEMENT REGARDING FEDERALLY SPONSORED RESEARCH

Not Applicable

BACKGROUND OF THE INVENTION

1. Field of the Invention

This invention relates generally to safety bumpers, and more particularly to a safety bumper for covering edges and corners of a street sign.

2. Description of Related Art

The following art defines the present state of this field: Kallionpaa, U.S. Pat. No. 5,974,712, teaches a form of protective jacket for a traffic sign. The protective jacket has first and second halves. The protective jacket has an edge having an elevation that extends outwardly beyond an outer periphery of the sign portion whereby to protect the outer periphery. Each of the outer surfaces is made of an elastic material. See also Tomboris, U.S. 2003/0110673. A similar approach, using a rigid cover, is shown in Sprung, U.S. Pat. No. 2,622,357.

Sarkisian, et al., U.S. Pat. No. 5,675,923, teaches a rigid sign member with a changeable protective plastic overlay. The overlay member can contain a wide variety of various messages and display indicia thus allowing the rigid sign backing member to be used for numerous different situations. Holder members are similar to "bumpers" but are used to hold the sign in place. One of the holder members can be removable for removal and placement of the overlay member. Preferably, the front surface of the rigid sign member has a reflective surface and the overlay member is made from a clear or transparent material.

Newhart, U.S. Pat. No. 5,165,818, teaches a free-standing traffic directing sign consisting of a base, a panel which fits into a slot in the base, and a breakway mounting assembly including a pin. The breakaway mounting assembly is connected to the base and is designed to retain the panel in the slot. When a predetermined force, such as a vehicle striking the sign, is applied to the panel and transmitted to the mounting assembly, the pin of the mounting assembly breaks allowing the panel to pop out of the slot. A new pin can be used to reassemble the panel and the base.

Other patents of general interest include: Gutzmer, U.S. Pat. No. 5,809,901, Copeland, Jr., U.S. Pat. No. 6,378,831, Shanok, et al., U.S. Pat. No. 5,440,857, C. E. Rowe, U.S. Pat. No. 3,294,353, Nickels, U.S. D509,544, and Oy, WO 96/19787

The above-described references are hereby incorporated by reference in full.

The prior art teaches various bumpers for covering the edges of a sign. However, the prior art does not teach a bumper having the benefits of the presently claimed invention. The present invention fulfills these needs and provides further related advantages as described in the following summary.

SUMMARY OF THE INVENTION

The present invention teaches certain benefits in construction and use which give rise to the objectives described below.

The present invention provides a safety bumper and method for covering edges and corners of a street sign. The safety bumper comprises an elongate bumper element and a clip element. The elongate bumper element has a pliable body, a generally U-shaped cross-section for fitting around the edges and corners of the street sign, and two ends. The pliable body has a thickness for preventing the street sign from causing injuries, while the pliable body is still pliant enough to wrap closely around the corners of the sign without bulging away from the street sign, enabling the elongate bumper to cover substantially all of the edges and corners. The clip element functions to clip together or otherwise fasten the two ends of the elongate bumper element.

A primary objective of the present invention is to provide a safety bumper having advantages not taught by the prior art.

Another objective is to provide a safety bumper that can be adapted to any size and shape of sign.

A further objective is to provide a safety bumper that has few parts, is inexpensive to manufacture, and is easy to install.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
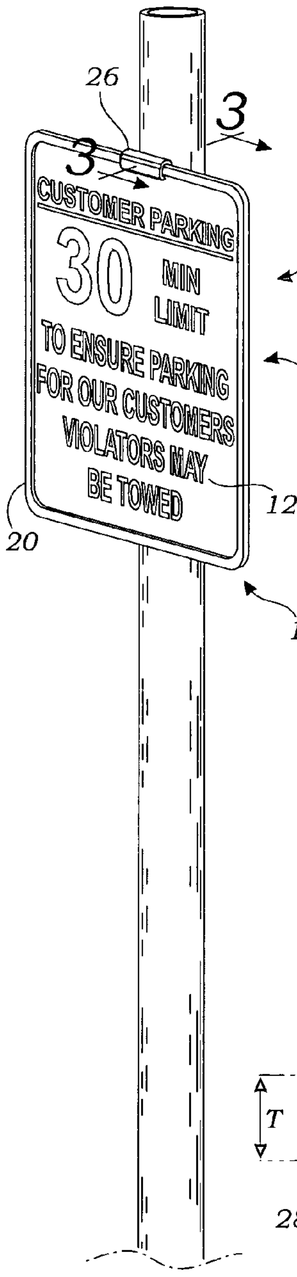
FIG. 1 is an perspective view of a safety bumper according to a preferred embodiment of the present invention.

The above-described drawing figures illustrate the invention, a safety bumper 10 for covering edges 14 and corners 16 of a street sign 12. The safety bumper 10 is specifically designed for street signs 12 that are mounted adjacent pedestrians, such as stop signs, parking signs, no-parking signs, or any other form of sign or signage which might cause injury to an unwary pedestrian who bumps into the sign 12.

As shown in FIG. 1, the safety bumper 10 includes an elongate bumper element 20 and a clip element 26. The elongate bumper element 20 has a pliable body 22 having a thickness T for preventing the street sign 12 from causing injuries. The elongate bumper element 20 also has a generally U-shaped cross-section for fitting around the edges 14 and corners 16 of the street sign 12. Despite the thickness T, the pliable body 22 is still pliant enough to wrap closely around the corners 16 of the sign 12 without bulging away from the street sign 12, enabling the elongate bumper 20 to cover substantially all of the edges 14 and corners 16.

The pliant nature of the elongate bumper element 20 is important to the invention. It is important that the elongate bumper element 20 be thick enough to protect persons who strike the sign, but pliant enough so that the elongate bumper element 20 does not bulge away from the sign when the elongate bumper element 20 is positioned around the edges 14 of the sign 12. The elongate bumper element 20 is preferably formed of a suitable vinyl material, although those skilled in the art can identify alternative materials such as various forms of rubber, pliant plastic, or other material that are suitably soft and pliable to also function as required, and such alternative materials should be considered within the scope of the present invention.

For purposes of this application, the term U-shaped should be construed broadly, and is hereby defined to include any similar or equivalent channel shape that functions to fit around and cover the edges 14 and corners 16 of the street sign 12.

The elongate bumper element 20 is long enough to fit around the perimeter of the sign 12, and has two ends 24. When the elongate bumper element 20 is positioned around the perimeter of the sign 12, the two ends 24 are positioned adjacent each other. The clip element 26 is adapted for clipping or otherwise fastening together the two ends 24 of the elongate bumper element 20.

The clip element 26 is preferably formed of a resilient plastic material, although other materials that function as described could also be adapted for the purpose of joining the ends 24 of the elongate bumper element 20.

Figure 2:
FIG. 2 is a perspective view of the clip element being installed on adjacent ends of the elongate bumper element.
Figure 3:
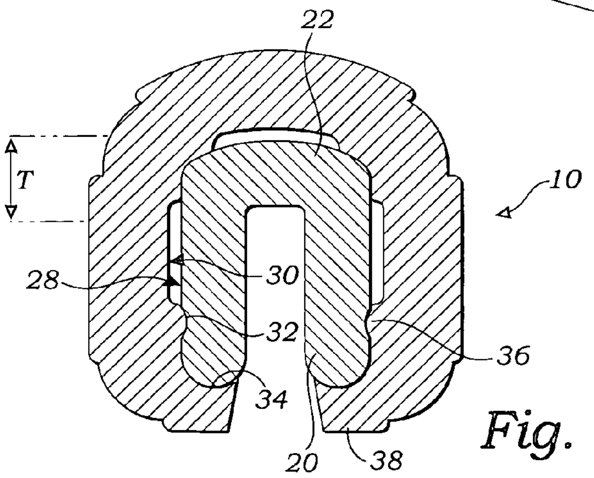
FIG. 3 is a sectional view thereof taken along line 3-3 in FIG. 1.
Figure 4:
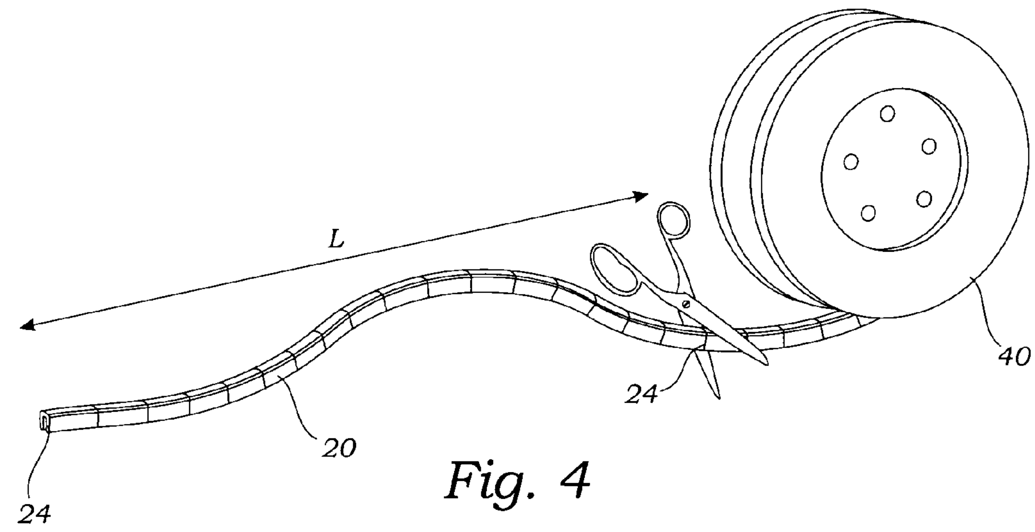
FIG. 4 is a perspective view of a roll of safety bumper material being cut to form an elongate bumper element.
Figure 5:
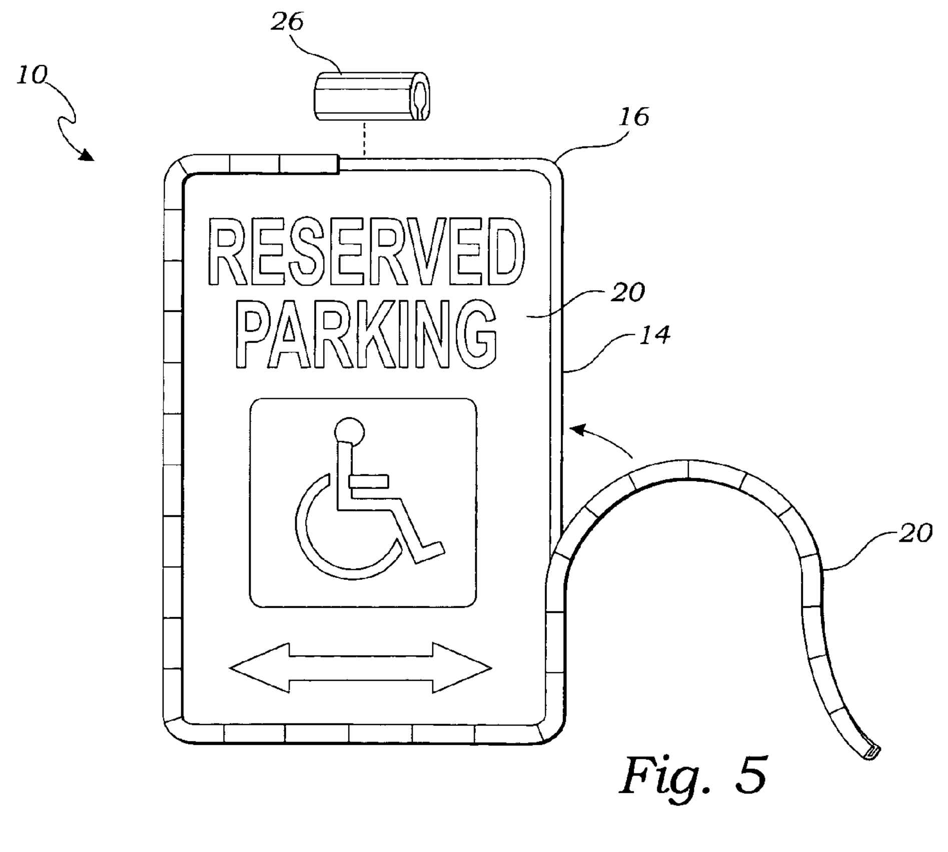
FIG. 5 is a perspective view of the elongate bumper element being installed on the sign.

In the preferred embodiment, as shown in FIG. 3, the elongate bumper element 20 has a shaped outer perimeter 28, and the clip element 26 has a shaped inner perimeter 30. The shaped inner perimeter 30 of the clip element 26 is shaped to lockingly engage the shaped outer perimeter 28 of the elongate bumper element 20. In the embodiment of FIG. 2, for example, the elongate bumper element 20 includes indented portions 32 and two edges 34, and the clip element 26 includes male portions 36 shaped to fit within the indented portions 32, and lips 38 shaped to fit around the edges 14 of the elongate bumper element 20. The clip element 26 preferably further includes shaped elements that are shaped to fit corners 16 of the elongate bumper element 20.

The invention further includes a method for covering edges 14 and corners 16 of a sign 12 to prevent injury to a person. The method utilizes a roll of an elongate bumper material 40 with a generally U-shaped cross-section. A length L of the elongate bumper material 40 that is approximately equal to the perimeter of the sign 12 is cut, thereby forming the elongate bumper element 20 with its two ends 24. The elongate bumper element 20 is frictionally engaged around the edges 14 and corners 16 of the sign 12 such that the two ends 24 of the elongate bumper element 20 are adjacent each other. Since the elongate bumper element 20 is constructed of a suitably pliable material, it is able to wrap around the corners 16 of the sign 12 without bulging away from the sign 12. This enables the entire perimeter of the sign 12 to be covered with a single length L of the elongate bumper material 40, without requiring the use of separate elements or corner 16 pieces.

The two ends 24 of the elongate bumper element 20 are then clipped with the clip element 26, such that the elongate bumper element 20 and the clip element 26 form a safety bumper 10 around all of the edges 14 and corners 16 of the sign 12. The clip element 26 is long enough to span any distance between the two ends 24, so that there is not break in the coverage of the edges 14 of the sign 12. The clip element 26 is hereby defined broadly to include any element that performs the assigned function of clipping or otherwise fastening, and should not be limited to the embodiment disclosed herein.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for covering edges and corners of a sign to prevent injury to a person, the method comprising the steps of:

providing an elongate bumper element with a generally U-shaped cross-section and two ends;

providing a clip element shaped to fit around the two ends of the elongate bumper element;

frictionally engaging the elongate bumper element around the edges and corners of the sign such that the two ends of the elongate bumper element are adjacent each other; and clipping the two ends of the elongate bumper element with the clip element, such that the elongate bumper element and the clip element form a safety bumper around all of the edges and corners of the sign.

2. The method of claim 1, wherein the elongate bumper element has a pliable body having a thickness for preventing the street sign from causing injuries.

3. The method of claim 1, wherein the elongate bumper element has a shaped outer perimeter, and wherein the clip element has a shaped inner perimeter, and wherein the shaped inner perimeter of the clip element is shaped to lockingly engage the shaped outer perimeter of the elongate bumper element.

4. A method for covering edges and corners of a sign to prevent injury to a person, the method comprising the steps of:

providing a roll of an elongate bumper material with a generally U-shaped cross-section;

providing a clip element;

cutting a length of the elongate bumper material that is approximately equal to the perimeter of the sign, thereby forming an elongate bumper element that has two ends;

frictionally engaging the elongate bumper element around the edges and corners of the sign such that the two ends of the elongate bumper element are adjacent each other; and clipping the two ends of the elongate bumper element with the clip element, such that the elongate bumper element and the clip element form a safety bumper around all of the edges and corners of the sign.

5. The method of claim 4, wherein the elongate bumper element has a shaped outer perimeter, and wherein the clip element has a shaped inner perimeter, and wherein the shaped inner perimeter of the clip element is shaped to lockingly engage the shaped outer perimeter of the elongate bumper element.

6. The method of claim 4, wherein the elongate bumper element has a pliable body having a thickness for preventing the street sign from causing injuries.

* * * * *